US012678961B2

(12) United States Patent
Holden

(10) Patent No.: US 12,678,961 B2
(45) Date of Patent: Jul. 14, 2026

(54) ROBOT GUIDANCE USING MULTIPLE FRAMES

(71) Applicant: TRUE POSITION ROBOTICS LIMITED, Lichfield (GB)

(72) Inventor: Roger Holden, Lichfield (GB)

(73) Assignee: TRUE POSITION ROBOTICS LIMITED, Lichfield (GB)

( * ) Notice: Subject to any disclaimer, the term of this patent is extended or adjusted under 35 U.S.C. 154(b) by 117 days.

(21) Appl. No.: 18/849,193

(22) PCT Filed: Mar. 20, 2023

(86) PCT No.: PCT/GB2023/050689

§ 371 (c)(1),
(2) Date: Sep. 20, 2024

(87) PCT Pub. No.: WO2023/180719

PCT Pub. Date: Sep. 28, 2023

(65) Prior Publication Data

US 2025/0205895 A1     Jun. 26, 2025

(30) Foreign Application Priority Data

Mar. 20, 2022    (GB) ...................................... 2203863

(51) Int. Cl.
B25J 9/16 (2006.01)
B23B 49/00 (2006.01)
(Continued)

(52) U.S. Cl.
CPC ............. B25J 9/1692 (2013.01); B23B 49/00 (2013.01); B25J 9/0096 (2013.01); B25J 13/089 (2013.01);
(Continued)

(58) Field of Classification Search
CPC ...... B25J 13/089; B25J 9/1697; B25J 19/022; B25J 19/021; B25J 11/00; B25J 15/0019;
(Continued)

(56) References Cited

U.S. PATENT DOCUMENTS 4,725,965 A     2/1988  Keenan
5,848,859 A  *  12/1998  Clark ................... G05B 19/404
                                                       901/41
(Continued)

FOREIGN PATENT DOCUMENTS

EP          0132616 A1      2/1985
EP          3369525 A1  *   9/2018    ......... B23Q 17/2233
(Continued)

OTHER PUBLICATIONS

International Search Report and Written Opinion for corresponding PCT Application No. PCT/GB2023/050689, filed Mar. 20, 2023, dated Jun. 6, 2023, 16 pages.
(Continued)

*Primary Examiner* — Adam R Mott
*Assistant Examiner* — James Miller Watts, III
(74) *Attorney, Agent, or Firm* — David D. Brush; Westman, Champlin & Koehler, P.A.

(57) ABSTRACT

A method and system for tracking a position of a robotic tool relative to a workpiece mounted on a workpiece holder. The method includes: i) identifying a first frame of reference defining the position of the workpiece; ii) identifying a second frame of reference defining a position of a machining head of the tool attached to a robotic arm, the tool further including a clamp moveable relative to the machining head; iii) identifying a third frame of reference defining a position of the clamp; iv) actuating the robotic arm to move the tool to a first target position relative to the workpiece; v) operating the clamp to apply a clamping force on the workpiece;

(Continued)

vi) measuring a position of the third frame of reference; and
vii) updating an offset to the first target position based on movement of the third frame of reference after operating the clamp.

25 Claims, 12 Drawing Sheets

(51) Int. Cl.
B25J 9/00          (2006.01)
B25J 13/08         (2006.01)
B25J 15/00         (2006.01)
*G05B 19/402*        (2006.01)

(52) U.S. Cl.
CPC .......... B25J 15/0019 (2013.01); *B25J 9/1694* (2013.01); *G05B 2219/39001* (2013.01)

(58) Field of Classification Search
CPC ...... B25J 9/0096; B25J 9/1692; B25J 9/1694; B25J 15/0095; G05B 2219/37097; G05B 2219/45059; G05B 19/402; B23B 49/008; B23B 2260/0482; B23B 39/14; B23B 49/00; B23Q 15/12; B23Q 17/2409; B23Q 17/2428; B23Q 17/2233
See application file for complete search history.

(56)                    References Cited

U.S. PATENT DOCUMENTS

| 10,639,804 | B2 | 5/2020 | Boria et al. | |
| 2016/0239013 | A1 * | 8/2016 | Troy | B25J 9/1664 |
| 2018/0169813 | A1 | 6/2018 | Wanner et al. | |
| 2021/0025692 | A1 | 1/2021 | Nahum | |
| 2021/0291310 | A1 | 9/2021 | Lei | |
| 2022/0214658 | A1 * | 7/2022 | Ros Vega | B23B 49/00 |

FOREIGN PATENT DOCUMENTS

| GB | 2593501 | A | | 9/2021 | |
| WO | WO-2004028755 | A1 * | 4/2004 | | G05B 19/00 |
| WO | 2021191610 | A1 | | 9/2021 | |

OTHER PUBLICATIONS

UK Search Report for corresponding Application No. GB 2203863. 2, filed Mar. 20, 2022, dated Sep. 21, 2022, 4 pages.

* cited by examiner

Robot Tool
- Tracked frame #3

704

705

703

702

Robot Tool
- Tracked frame #2

701

Robot Tool
- Tracked frame #1

1001 — Identify frames of reference

1002 — Actuate robot arm to target position

1003 — Operate clamp

1004 — Measure 3rd frame of reference

1005 — Update local offset

1101 Identify frames of reference

1102 Actuate robot arm to target position

1103 Operate clamp

1104 Measure 3rd frame of reference

1105 Update local offset

1106 Within tolerance?

1108 Withdraw clamp

No

Yes

1107 Machine workpiece

ROBOT GUIDANCE USING MULTIPLE FRAMES

CROSS-REFERENCE TO RELATED APPLICATIONS

This Application is a Section 371 National Stage Application of International Application No. PCT/GB2023/050689, filed Mar. 20, 2023, and published as WO 2023/180719 on Sep. 28, 2023, in English, which claims priority to Great Britain patent Application No. GB2203863.2, filed Mar. 20, 2022, the contents of which are incorporated herein by reference in their entireties.

FIELD OF THE INVENTION

The invention relates to a method and system for tracking a position of a robotic tool using multiple frames of reference.

BACKGROUND

In high precision robotic drilling or machining applications, for example in the aerospace industry, numerous holes may need to be drilled at various precisely defined locations in a component. The holes may need to be oriented at different angles as well as different positions, so a drilling tool having multiple axes of movement may be required. A robotic arm equipped with a drilling tool may be used for this purpose. While such robotic arms can achieve reasonable degrees of accuracy due to feedback from internal encoders on each joint, positional errors may occur in three main different ways. FIG. 1 illustrates the origin of three different types of possible errors in a robotic arm. Kinematic errors (FIG. 1a) result in positional or rotational errors at each joint. Compliance and process forces (FIG. 1b) result in errors arising from forces on the robotic arm that create displacement without necessarily resulting in any movement being measured. Backlash, or lost motion, errors (FIG. 1c) result from slack being taken up in various gearing throughout the robotic arm. Each of these types of error may combine to result in a reduced positional and orientation accuracy when using a robotic arm for a drilling operation.

In robotic machining operations, a clamp may be used to ensure that a machining head is held in position against a component to be machined. The clamp may be pneumatically actuated, applying a high pressure against the workpiece. The pressure can force the drill out of its intended position, leading to inaccurate positioning. In addition, such pressures may cause damage to the workpiece, which may not be evident if for example the workpiece is formed of a composite material.

WO 2021/191610 A1 discloses a robot drilling clamp and methods for operating a robotic drill using the clamp. The clamp comprises a force sensor and a frame that is linearly moveable relative to an attachment portion along a central axis relative to a drilling tool, allowing a controlled clamping force to be applied to a workpiece to be machined, which reduces positioning errors that can otherwise result due to the above described errors in positional and orientation accuracy when using a robotic arm.

A further problem with the use of a clamp, even if the force applied is controlled, is that the compliance of the robot arm will vary depending on the position and orientation of the tool, resulting in an unknown shift in position when applying a clamping force prior to a machining operation, leading to inaccuracies in machining.

SUMMARY OF THE INVENTION

According to a first aspect there is provided a computer-implemented method of tracking a position of a tool relative to a workpiece mounted on a workpiece holder, the method comprising:
   i) identifying a first frame of reference defining a position of the workpiece;
   ii) identifying a second frame of reference defining a position of a machining head of the tool attached to a robotic arm, the tool being moveable relative to the workpiece using the robotic arm and further comprising a clamp moveable relative to the machining head;
   iii) identifying a third frame of reference defining a position of the clamp;
   iv) actuating the robotic arm to move the tool to a first target position relative to the workpiece;
   v) operating the clamp to apply a clamping force on the workpiece;
   vi) measuring a position of the third frame of reference; and
   vii) updating an offset to the first target position based on movement of the third frame of reference after operating the clamp.

An advantage of the method is that the effect of the clamping operation on the position of the tool relative to the workpiece is taken into account, thereby ensuring a machining operation can be performed with increased accuracy. The method may be carried out as part of a calibration routine prior to machining, so that offsets can be generated and stored for use in subsequent machining operations. The method can also be used to update offsets during machining operations to further improve accuracy.

The first frame of reference may be identified based on a plurality of datums on the workpiece holder and/or on the workpiece. The second frame of reference may be identified based on a plurality of datums on the machining head. The third frame of reference may be identified based on a plurality of datums on the clamp.

The first, second and third frames of reference each define a three dimensional position and orientation of a point on the workpiece, machining head and clamp respectively.

The method may be repeated for a plurality of target positions on the workpiece. An offset may be stored for each of the plurality of target positions.

Steps iv) to vii) may be repeated if the measured position of the third frame of reference is outside of a predetermined tolerance.

The method may further comprise operating the machining head to machine the workpiece. A clamping force applied by the clamp during machining the workpiece may be updated based on a measure of movement of the third frame of reference relative to the first frame of reference during machining of the workpiece. The clamping force may for example be increased if the measure of movement exceeds a predetermined range.

According to a second aspect there is provided a computer-implemented method of tracking a position of a workpiece relative to a tool, the method comprising:
   i) identifying a first frame of reference defining a position of the workpiece, the workpiece being attached to an end of a robotic arm;

ii) identifying a second frame of reference defining a position of a machining head of the tool, the tool further comprising a clamp moveable relative to the machining head;

iii) identifying a third frame of reference defining a position of the clamp;

iv) actuating the robotic arm to move the workpiece to a first target position relative to the tool;

v) operating the clamp to apply a clamping force on the workpiece;

vi) measuring a position of the first frame of reference; and vii) updating an offset to the first target position based on movement of the first frame of reference after operating the clamp.

The second aspect differs from the first aspect in that the robotic arm moves the workpiece rather than the tool. The method is otherwise similar to the first aspect in that movement caused by the clamping operation is accounted for, which in this case will tend to cause the workpiece to move away from a target position rather than the clamp. Other features of the first aspect may also apply to the second aspect. In the second aspect, the tool may be in a fixed position or may be attached to another robotic arm.

According to a third aspect, there is provided a computer program comprising instructions for causing a computer system to perform the method according to the first or second aspects. The computer program may be stored on a non-transitory computer-readable medium.

According to a fourth aspect there is provided a robotic system comprising:

a robotic arm having a tool attached thereto, the tool comprising a machining head and a clamp moveable relative to the machining head;

a workpiece holder configured for mounting a workpiece to be machined;

a metrology system configured to measure a position of the workpiece and positions of the machining head and clamp relative to the workpiece;

a controller connected for control of the metrology system, robotic arm and tool, wherein the controller is configured to:

i) identify, using the metrology system, a first frame of reference defining a position of the workpiece;

ii) identify, using the metrology system, a second frame of reference defining a position of the machining head;

iii) identify, using the metrology system, a third frame of reference defining a position of the clamp;

iv) actuate the robotic arm to move the machining head to a first target position relative to the workpiece;

v) operate the clamp to apply a clamping force on the workpiece;

vi) measure, using the metrology system, a position of the third frame of reference; and vii) update an offset to the first target position based on movement of the third frame of reference after operating the clamp.

The first frame of reference may be defined by a plurality of datums on the workpiece holder and/or on the workpiece. The second frame of reference may be defined by a plurality of datums on the machining head. The third frame of reference may be defined by a plurality of datums on the clamp. The first, second and third frames of reference may each define a three dimensional position and orientation of a point on the workpiece, machining head and clamp respectively.

The controller may be configured to repeat steps i) to vii) for a plurality of target positions on the workpiece. The controller may be configured to store an offset for each of the plurality of target positions.

The controller may be configured to repeat steps iv) to vii) if the measured position of the third frame of reference is outside of a predetermined tolerance.

The controller may be configured to operate the machining head to machine the workpiece. The controller may be further configured to apply a clamping force by the clamp during machining the workpiece and update the offset based on a measure of movement of the third frame of reference during machining of the workpiece. The controller may be configured to increase the clamping force if the measure of movement exceeds a predetermined range.

According to a fifth aspect there is provided a robotic system comprising:

a robotic arm having a workpiece attached thereto;

a tool comprising a machining head and a clamp moveable relative to the machining head;

a metrology system configured to measure a position of the workpiece and positions of the machining head and clamp;

a controller connected for control of the metrology system, robotic arm and tool, wherein the controller is configured to:

i) identify, using the metrology system, a first frame of reference defining a position of the workpiece;

ii) identify, using the metrology system, a second frame of reference defining a position of the machining head;

iii) identify, using the metrology system, a third frame of reference defining a position of the clamp;

iv) actuate the robotic arm to move the workpiece to a first target position relative to the tool;

v) operate the clamp to apply a clamping force on the workpiece;

vi) measure, using the metrology system, a position of the first frame of reference; and vii) update an offset to the first target position based on movement of the first frame of reference after operating the clamp.

Similarly to the second aspect, the fifth aspect defines the system in the case where the workpiece is moved and the tool remains stationary. In other alternatives the tool may be mounted to another robotic arm.

BRIEF DESCRIPTION OF THE DRAWINGS

The invention is described in further detail below by way of example and with reference to the accompanying drawings, in which.

DETAILED DESCRIPTION OF ILLUSTRATIVE EMBODIMENTS

Figure 1:
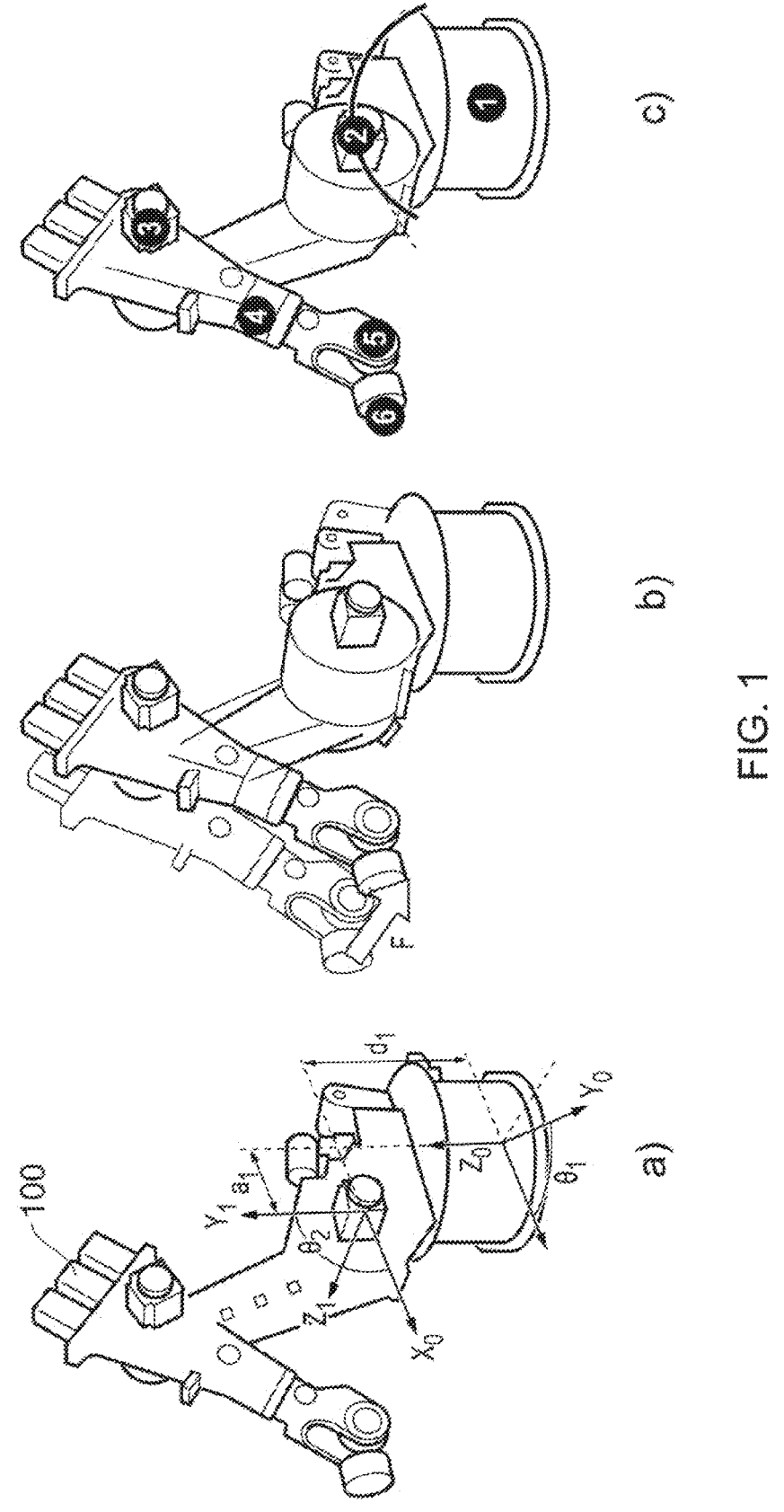
FIG. 1 is a schematic diagram illustrating three different types of positioning errors in a robotic arm.
Figure 2:
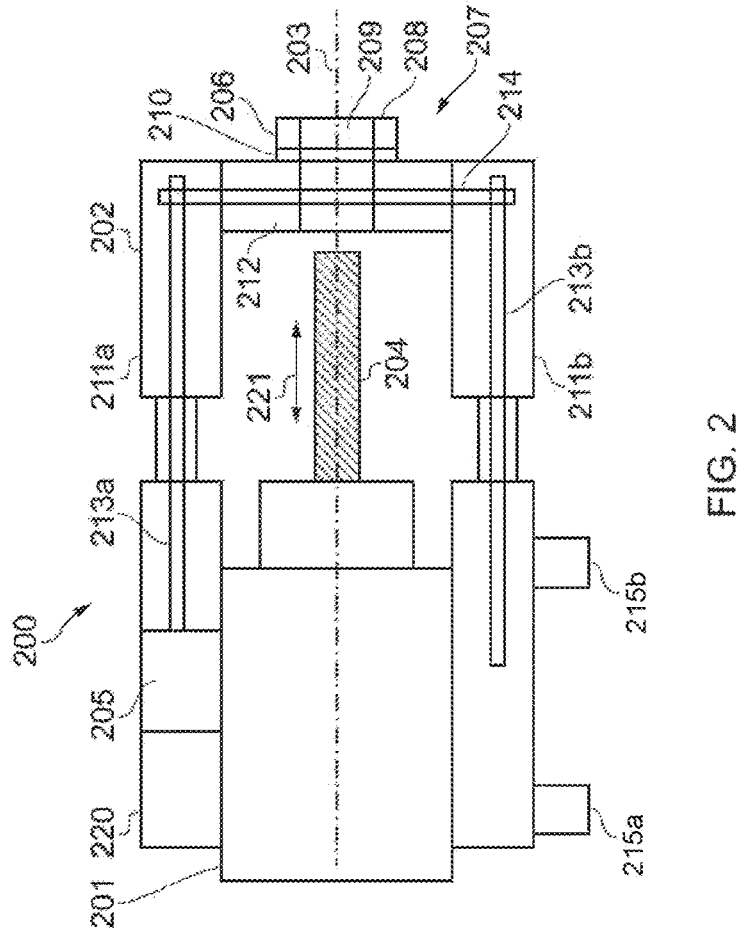
FIG. 2 is a schematic sectional view of an example clamp attached to a drilling tool.

FIG. 2 is a schematic drawing of an example clamp 200 configured for attachment to a machining head 201 for attachment to a robotic arm of the type shown in FIG. 1. The clamp 200 comprises an attachment portion 220 for attachment to the machining head 201, and a frame 202 that is linearly moveable relative to the attachment portion 220 along a central axis 203 of the machining head 201, i.e. along a rotational axis of a drill bit 204 attached to the machining head 201. The machining head 201 may be a drilling tool configured to drill a workpiece by actuating a drill bit 204 along the central axis 203 in the direction indicated by arrow 221.

The clamp 200 comprises an actuation mechanism comprising a servo motor 205 configured to drive linear movement of the frame 202 relative to the attachment portion 220, i.e. relative to the machining head 201. A workpiece contacting portion 206 at a distal end 207 of the frame 202 comprises a surface 208 for contacting a surface of a workpiece to be drilled and an aperture 209 allowing for passage of the drill bit 204 through to the workpiece surface.

A force sensor 210 is arranged to measure a force acting on the workpiece contacting portion 206 in the drilling direction. The force sensor 210 may for example form part of the workpiece contacting portion 206 or may be provided elsewhere in the frame 200 or attachment portion 220 to measure a force acting along the central axis 203 between the workpiece and the machining head 201.

The workpiece contacting portion 206 may have a non-slip surface 208 for contacting the workpiece.

The frame 202 in the example of FIG. 2 generally has a C-shape, with a pair of arms 211a, 211b extending in the drilling direction on either side of the central axis 203 and a distal end piece 212 extending between the pair of arms 211a, 211b. The arms 211a, 211b and the distal end piece 212 may be of unitary construction, for example formed of a single piece of metal, to aid stiffness and prevent distortion of the frame 202 during use. Other shapes may also be possible, and the frame 202 may have more than two arms 211a, 211b.

The servo motor 205 drives each of the arms 211a, 211b of the frame 202 by driving respective rods 213a, 213b extending along each arm 211a, 211b. A pulley or timing belt 214 extends between the pair of arms 211a, 211b across the distal end section 212, allowing for the rotation of the rods 213a, 213b to be synchronised so that the frame 202 moves in a uniform linear direction along the central axis 203, thereby applying a force on the workpiece parallel with the drilling direction.

A plurality of datums 215a, 215b are attached to the part of the clamp that is secured to the machining head 201, i.e. the attachment portion 220, to allow for a metrology system to determine a location of the machining head 201, described in further detail below. Typically at least three datums will be required to enable a precise location and orientation in three-dimensional space to be determined.

Figure 3:
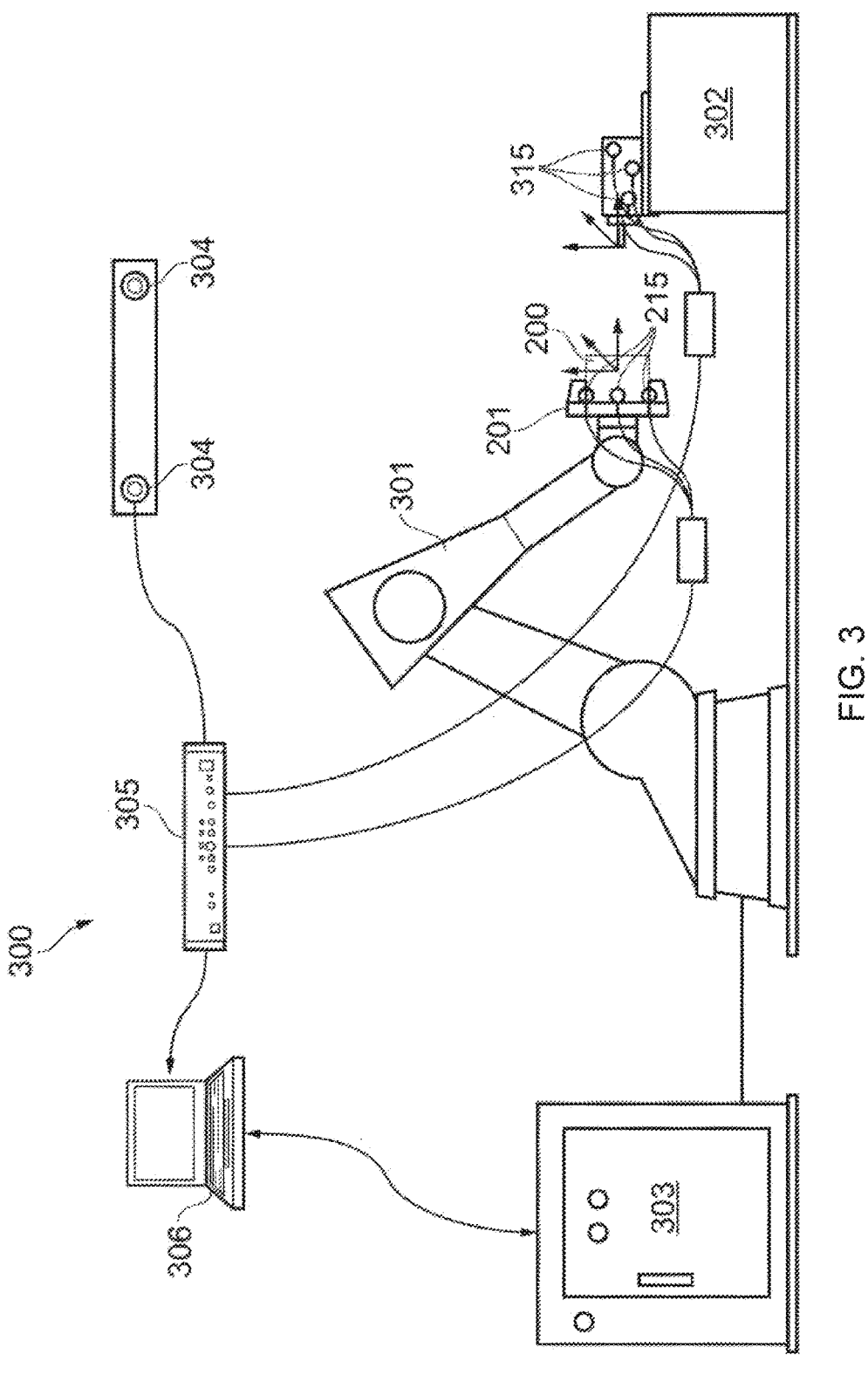
FIG. 3 is a schematic diagram of an example robotic drilling system.

FIG. 3 illustrates schematically an example robotic drilling system 300. The system 300 comprises a robotic arm 301 comprising a machining head 201, on to which a clamp 200 of the type described above may be attached. A workpiece holder 302 is provided for holding a workpiece (not shown) to be machined. A controller 303 is connected to the robotic arm 301 for control of the machining head 201. The controller 303 actuates the robotic arm 301 to contact the surface of the workpiece contacting portion 208 (FIG. 2) to the surface of a workpiece to be machined and actuates the servo motor 205 in the clamp 200 to drive the clamp 200 on to the workpiece while measuring a force from the force sensor 206 until a predetermined force has been reached. The controller 303 may then operate the machining head 201 to drill a hole into the workpiece.

The system 300 comprises a metrology system 304, 305 for measuring a position of the machining head 201 relative to the workpiece to be machined. The metrology system identifies a first plurality of datums 315 on the workpiece holder 302 and a second plurality of datums 215 on the robotic drill 301, specifically on the part of the clamp 200 that is attached to the machining head 201, i.e. the attachment portion 220. Each of the plurality of datums 215, 315 comprises at least three datums to enable accurate positioning and orientation of the workpiece holder 302 and machining head 201 in three-dimensional space relative to each other. The datums 215, 315 may for example be light emitting elements or passive sensors. As in the example shown in FIG. 3, plurality of light detecting elements 304 may be arranged to receive light from each of the light emitting or reflective elements 215, 315, signals from which are received by a metrology control unit 305. The metrology control unit 305 may also control operation of the light emitting elements 215, 315. The metrology control unit 305 may provide position information to a computer 306, which also communicates with the controller 303.

The first and second plurality of datums 315, 215 define respective first and second frames of reference, based on which the position and movement of the tool 201 can be controlled relative to the workpiece. The system 300 can thereby be used to solve for cartesian inaccuracies in the position of the tool 201 and can assist in resolving compliance and backlash errors.

Although the controller 303, computer 306 and metrology control unit 305 are illustrated as separate components in FIG. 3, these components may be contained in, or considered as being, a single controller, or a controller may be considered to be distributed between and among the different functional components 303, 306, 305.

The metrology system allows the robotic system 300 to measure the relative locations of the machining head 201 and workpiece holder 302, thereby allowing the controller 303 to compensate for any difference in location of the machining head 201 after actuation of the clamp 200 before a drilling operation. This may for example be carried out during each drilling operation or may be carried out prior to performing any drilling operations on a workpiece.

Figure 4A:
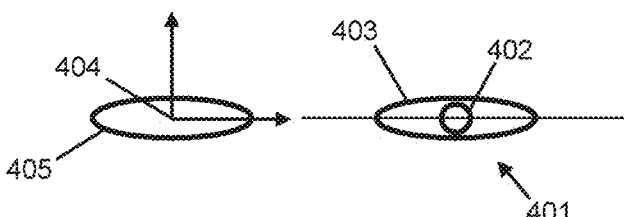
FIGS. 4a-4c are schematic diagrams of frames of reference defined by measured positions of datums.

FIG. 4 illustrates the general principle of the use of markers on a physical object. In FIG. 4a a single marker or datum 401 is shown. The datum 401 has an actual position 402 and a positional uncertainty 403 resulting from accuracy of measuring the actual position of the datum 401. The measurement uncertainty may vary in different dimensions, indicated by the oval shape of the positional uncertainty 403. The measured position is used to set a frame of reference 404, which in the case of a single datum can define a position in only two dimensions and with no information on orientation. The frame of reference 404, which has a positional uncertainty 405 corresponding to the positional uncertainty 403 of the datum 401, can be used to define an arbitrary position in virtual space to define the location of an object associated with the frame of reference 404, i.e. an object that is physically fixed relative to the datum 401.

Figure 4B:
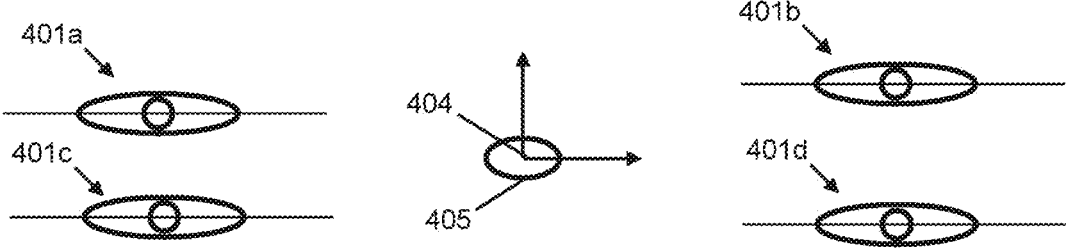

FIG. 4b illustrates the use of a plurality of datums 401a-d to more accurately define the frame of reference 404. The positional uncertainty 405 of the frame of reference 404 is reduced by the use of multiple datums. In this example, all datums 401a-d are in the same plane and the frame of reference 404 is defined in two linear dimensions and in one rotational dimension.

Figure 4C:
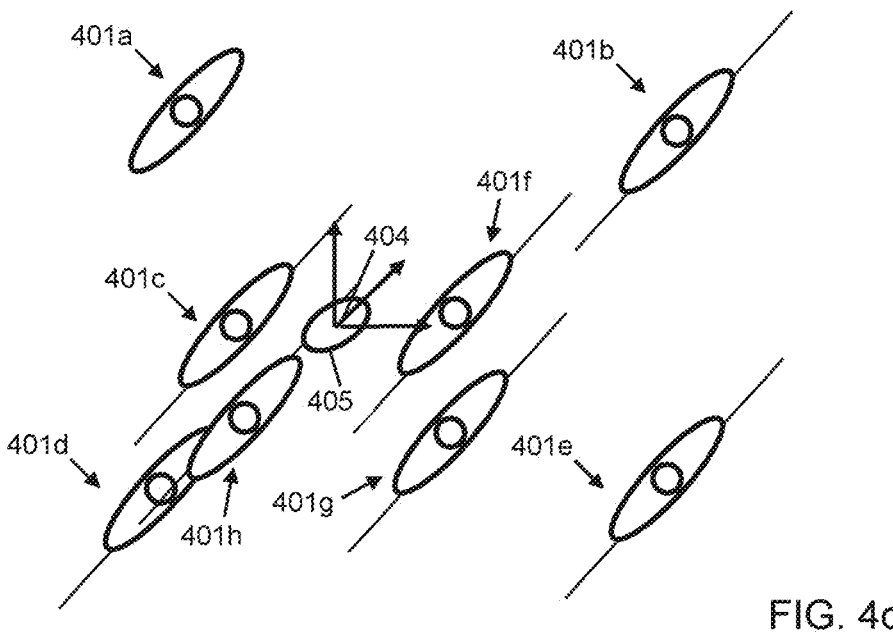

FIG. 4c illustrates the use of a larger plurality of datums 401a-h to further define the frame of reference 404, the datums 401a-h in this case being arranged in three dimensions to enable the frame of reference 404 to be located in all three linear dimensions and all three rotational dimensions, each with an associated measurement uncertainty dependent on the combined measurement uncertainty of the datums 401a-h.

In theory, a minimum of three datums is required to define a frame of reference 404 in all six dimensions. In practice, however, a minimum number of datums is generally found to be eight so that a degree of redundancy is provided when not all datums are visible and to reduce the positional uncertainty of the frame of reference by combining the measured positions of the datums 401a-h. The positional accuracy may be influenced by the type of datum, i.e. whether active or passive, as well as the visibility around the object on which the datums are fixed.

Figure 5:
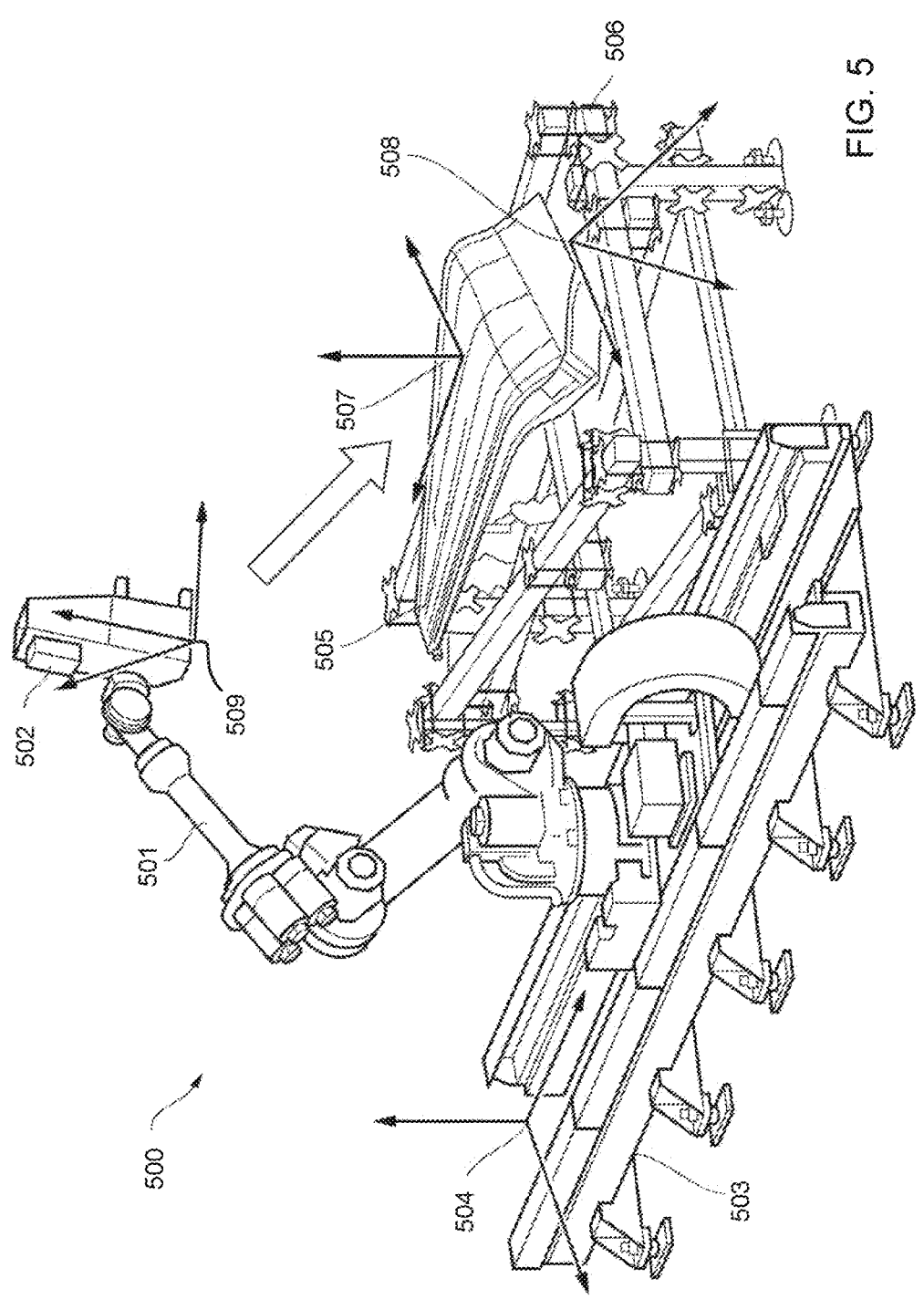
FIG. 5 is a diagram of an example robotic drilling system.

FIG. 5 is a drawing indicating various component parts of an example robotic drilling system 500, including a robotic arm 501 with a tool 502, which may comprise a machining tool and clamp of the type described above. The robotic arm 501 is mounted on a base frame 503 that is associated with a robot system origin 504. A workpiece 505 to be machined is mounted on a workpiece holder 506, which is fixed in position relative to the robot base frame 503. In operation, the tool 502 is moved relative to the robot system origin 504 to a target 507 on the workpiece 505. The target 507 may be defined in a 3D CAD model relative to an origin 508 of the workpiece holder 506. The first frame of reference defining the position of the workpiece 505 can be redefined during operation of the system 500, for example to accommodate accurate drilling of a part that, through tolerance build up, is not within nominal range of a frame based on the origin 508. More than one workpiece may be mounted on the workpiece holder, with the first frame of reference being redefined for each workpiece.

The origin 508 of the workpiece holder 506 may define a first frame of reference, to which the robot system origin 504 is in a fixed relative position. The first frame of reference can define both the position and orientation of the workpiece 505 and the robot base frame 504, since these are fixed in position relative to each other. The first frame of reference may be considered as a variable for individual parts within the assembly that can change with each build. The workpiece 505 may be provided with datums to enable it to be located relative to the workpiece holder 506 and base frame 503. A predefined position on the workpiece 505 can then be located relative to the first frame of reference, for example based on a three dimensional CAD model of the workpiece or the component parts thereof.

The robotic arm 501 is instrumented to provide a measure of the position and orientation of the tool 502. As described above, the positioning provided by the robotic arm 501 is subject to various positioning errors. Datums on the tool 502 defining a second frame of reference 509 can be used to correct for such errors through use of a metrology system as described above. The actual measured position of the tool 502 is determined based on the second frame of reference 509 and a corrected positional demand provided to the robotic arm to position the tool 502 in the desired position relative to the first frame of reference.

Figures 6A, 6B, 6C:
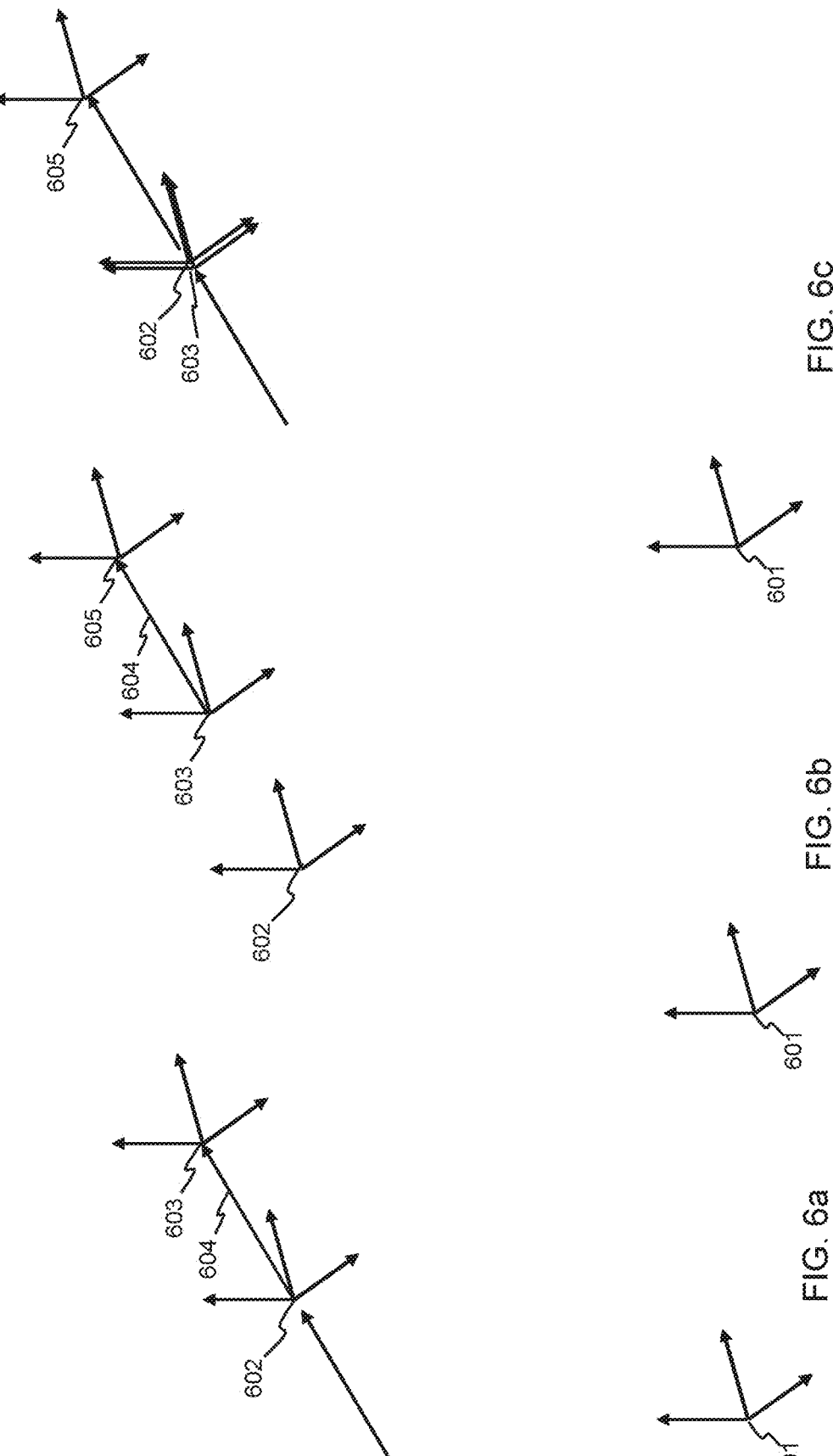
FIGS. 6a-6c are schematic diagrams illustrating a sequence of moves for a tool attached to a robotic arm based on first and second frames of reference.

In operation, when the robotic arm 501 moves, the position and orientation in three dimensional space of the second frame of reference 509 is measured by detecting the positions of datums on the tool 502 using the metrology system. The nominal position of the tool 502, as determined by instrumentation on the robotic arm 501, can then be corrected using the second frame of reference. A sequence of operations is illustrated in FIG. 6, in which the first frame of reference 601 defines the position and orientation of the workpiece 505 mounted on the workpiece holder 506, linked through the robot origin frame 504, and the second frame of reference 602 defines the actual measured position and orientation of the tool 502. A nominal position 603 of the tool 502, as defined in an offline CAD digital twin for the robot arm 501, which is determined by the position indicated by instrumentation on the robotic arm 501, may differ from the position of the second frame of reference 602. In a first step, shown in FIG. 6a, the robotic arm is instructed to move to a nominal position 603, which may for example be a position proximate a workpiece to be machined. The actual position of the tool is measured once the movement is performed and the second frame of reference 602 determined to be different to the nominal position 603. The difference 604 is then added to the measured position of the second frame of reference 602, resulting in a calculated new virtual target position 605 for the robotic arm to move to, shown in FIG. 6b. The robotic arm is then instructed to move to the virtual target position 605, resulting in the position of the second frame of reference 602 and the initial nominal position 603 being a closer match, as shown in FIG. 6c. This process may be iterated further to reduce the positional error of the tool to within the positional accuracy of the second frame of reference 602.

Figure 7:
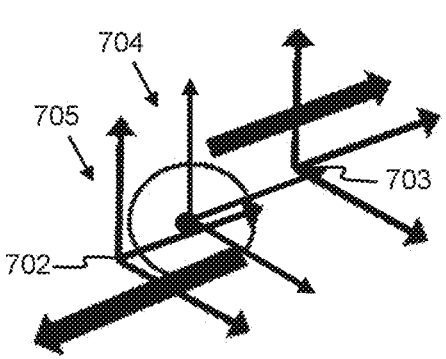
FIG. 7 is a schematic diagram illustrating first, second and third frames of reference during movement of a robotic tool.
Figure 7:
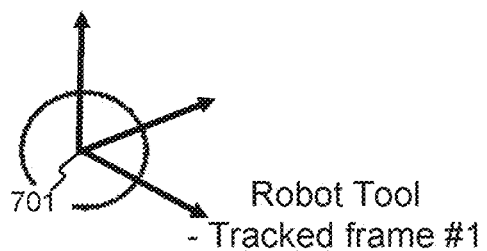

A problem with the above is that, when operating the clamp 200 (FIG. 2) to drive the frame 202 on to the workpiece, the position of the tool 201 will move, which may move the tool out of alignment with the workpiece depending on the orientation of the robotic arm relative to the workpiece. This is illustrated schematically in FIG. 7. The first frame of reference 701 indicates the position of the base frame for the robot arm, i.e. the datum target reference for the part to be processed. The second frame of reference 702 on the tool is initially robotically moved to a first position 704, for example following a sequence of operations described above in relation to FIG. 6. The frame on the tool is then actuated to clamp the tool against the workpiece. This causes the second frame of reference to move away from the first position 704 to a second position 705 as compliance is taken up in the robot arm and in the workpiece. This may cause the position of the tool to shift, resulting in inaccurate machining. To correct for this, a third frame of reference 703 is defined on the clamp frame, the position of which is monitored through determining the location of a plurality of datums on the clamp frame. As the clamp is actuated, the position of the third frame of reference 703 is measured and compared to a nominal position defined off-line in a digital twin or robot simulation. The movement of the second frame of reference 702 will vary depending on various factors including the clamping force required and the compliance of the workpiece and robot arm, which will vary with the orientation of both the robot arm and workpiece. The measured position of the third frame of reference can therefore be used to apply a learnt offset to the position of the robot arm specific to each machining position. An offset learnt for each machining position can be used for subsequent workpieces and updated on each operation.

Figure 8:
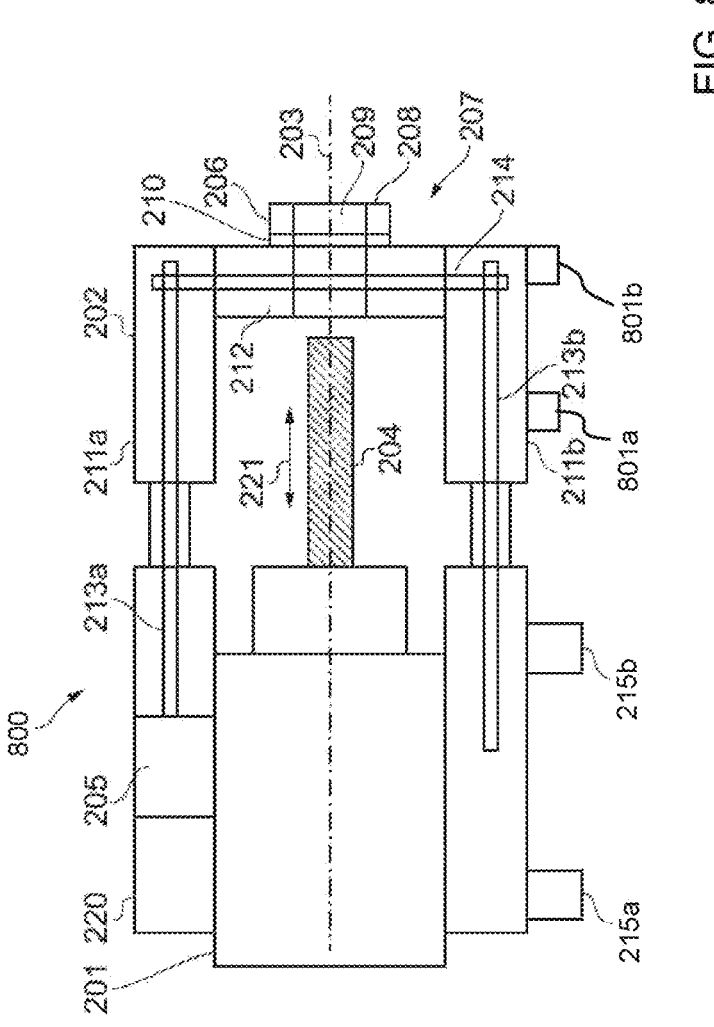
FIG. 8 is a schematic sectional view of an example clamp attached to a drilling tool.

FIG. 8 illustrates an example clamp 800 of the type illustrated in FIG. 2, with corresponding features as described above. As well as the first plurality of datums 215a, 215b (a minimum number of three being required) attached to the part of the clamp 800 secured to the machining head 201, the clamp 800 comprises a second plurality of datums 801a, 801b (also at least three) attached to the clamp frame 202, which is linearly moveable relative to the attachment portion. Only two datums 801a, 801b are shown in FIG. 8, but in practice a minimum of three datums will be required to define a third frame of reference for the frame 202. In practice more datums may be needed, for example a minimum of eight datums located around the frame 202 to reduce the positional uncertainty and to ensure the metrology system can accurately locate the third frame of reference in all orientations.

Figure 9B:
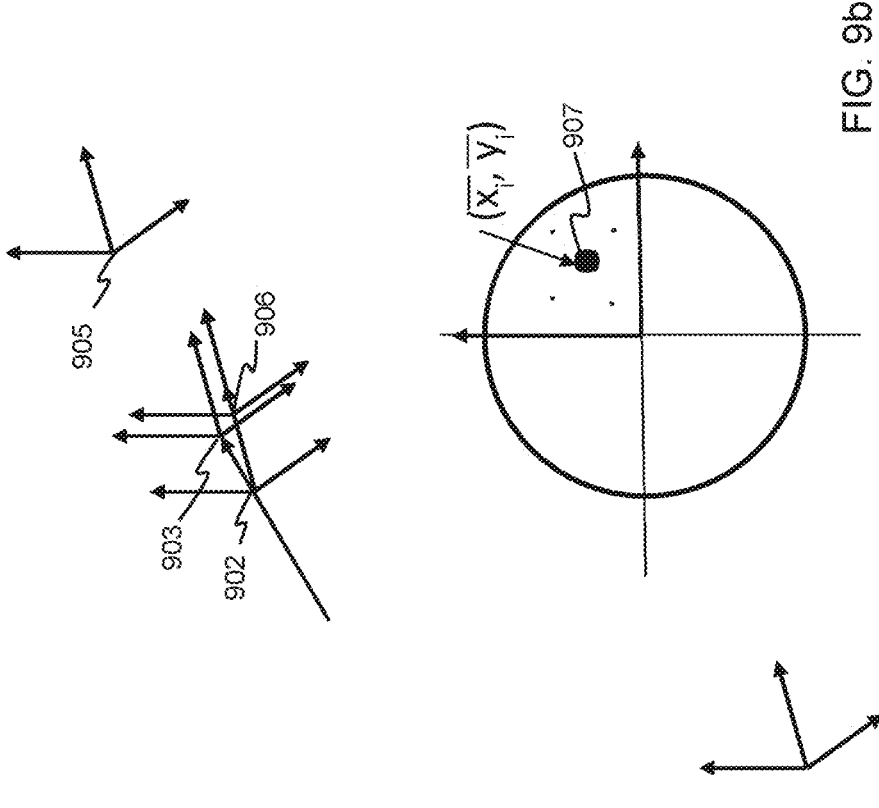
FIGS. 9a and 9b are schematic diagrams illustrating a sequence of operations during movement of a robotic tool using first, second and third frames of reference.
Figure 9A:
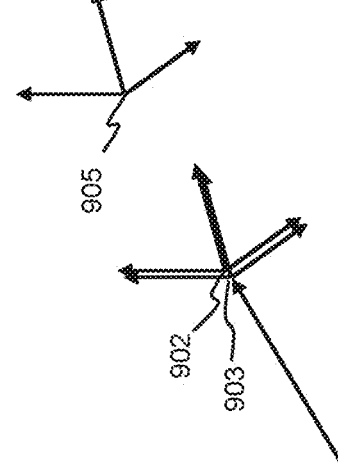

FIG. 9 illustrates the use of the first, second and third frames of reference in positioning a tool for machining a workpiece at a specified location. In FIG. 9a, the first and second frames of reference 901, 902 are positioned as in FIG. 6c, following an offset to move the tool to a virtual target position 905 so that the measured position of the tool closely matches the nominal required position. The clamp then engages, resulting in the tool lifting off the workpiece and moving away from the nominal position 903, as shown in FIG. 9b, making the second frame of reference 902 no longer useful. The third frame of reference 906, which is fixed to the frame, then takes over as the reference for the position of the tool. Due to compliance of the robot arm and the workpiece, the direction of movement of the second frame of reference 902 during clamping may be different to the axis 203 of the clamp (see FIG. 8). An offset 907 is then measured resulting from clamping, which in FIG. 9b is illustrated as a two-dimensional offset $(\overline{x}_i, \overline{y}_i)$, based on measurement of the position of the third frame of reference. This offset can then be used to calibrate the position of the second frame of reference to result in a more accurate machining location.

Figure 10:
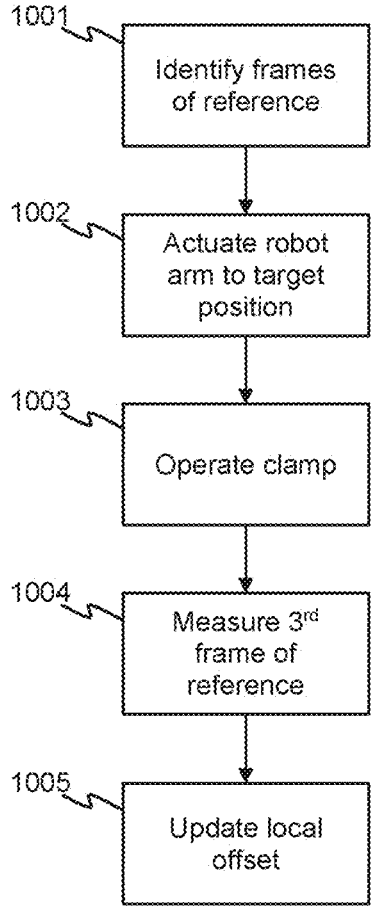
FIG. 10 is a schematic flow diagram illustrating an example method of tracking a position of a tool relative to a workpiece mounted on a workpiece holder in a calibration mode.

FIG. 10 is a flow diagram illustrating an example sequence of operations involving a 'dry cycle' or calibration run using first, second and third frames of reference. In a first step 1001, the three frames of reference are identified, i.e. the first frame of reference defining a position of the part in the workpiece holder, the second frame of reference defining the position of the tool and the third frame of reference defining a position of the clamp frame. Based on a 3 dimensional computer model of the workpiece and robotic arm, a target position for the tool is defined and, in step 1002, the robot arm is actuated to move to the target position. The second frame of reference is used to adjust the position of the tool based on a measured difference between the actual measured position of the tool and the nominal position of the tool as defined in the digital twin for the robot arm. Once the tool is in the required position, i.e. against a location on the workpiece for machining, in step 1003 the clamp is operated to provide a required clamping force against the workpiece. The third frame of reference on the clamp frame is measured in step 1004 to determine an offset resulting from the clamping operation. A local offset for the target position is then updated in step 1005. The cycle may be repeated for each machining location, resulting in a local offset being stored for each target position corresponding to a machining location on the workpiece. Each machining location may be visited more than once so that the local offsets can be updated. At least two cycles for each machining location are expected to be required to ensure an accurate repeatable offset for each location. For a practical implementation, a positional accuracy with an RMS error of less than 0.2 mm may be reached based on two measurement cycles.

Figure 11:
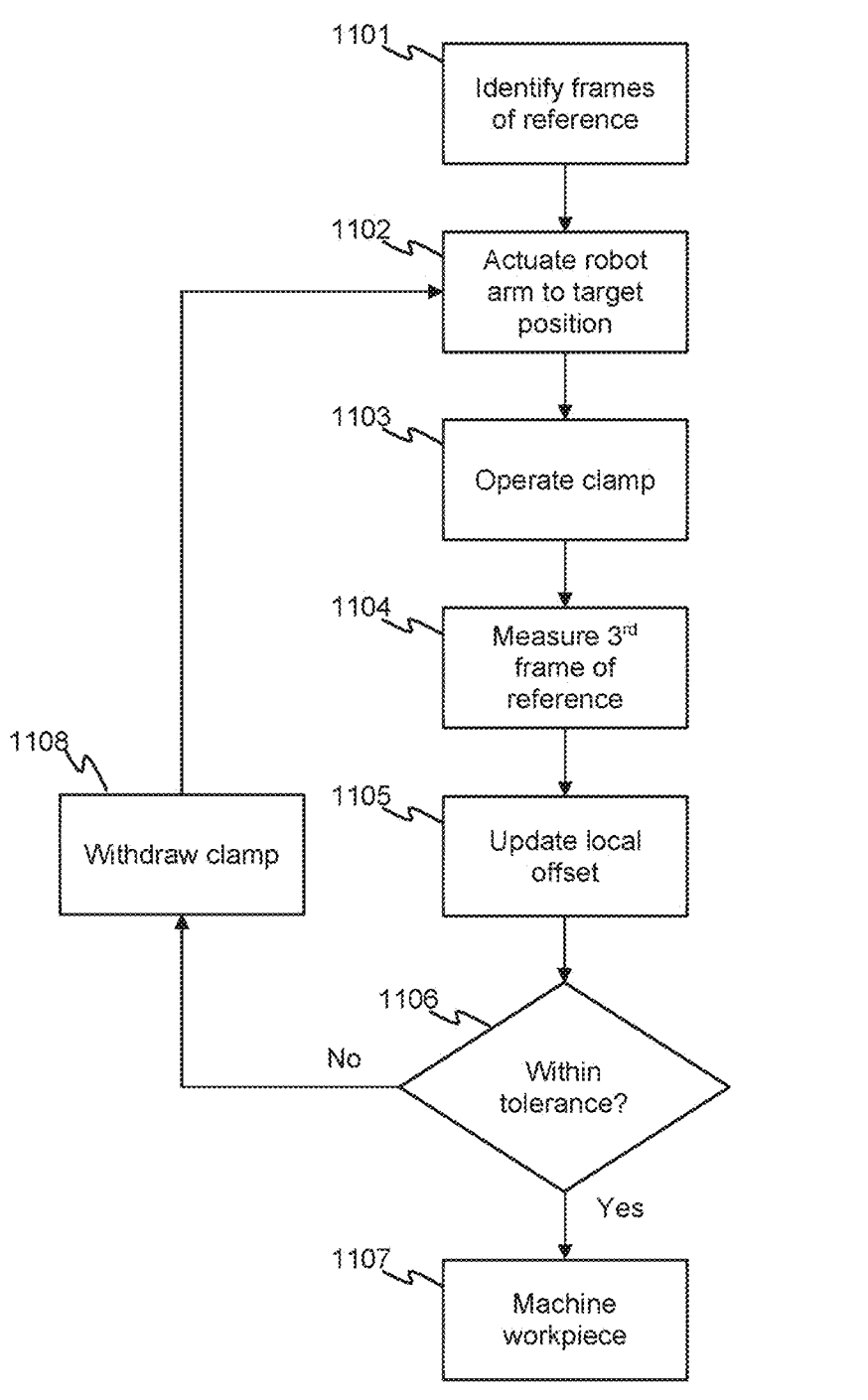
FIG. 11 is a schematic flow diagram illustrating an example method of tracking a position of a tool relative to a workpiece mounted on a workpiece holder in a machining mode.

FIG. 11 is a flow diagram illustrating an example sequence of operations involving machining a workpiece using a robotic tool. The sequence of operations is similar to those in FIG. 10, with the addition of a machining step. In a first step 1101, the three frames of reference are identified, i.e. the first frame of reference defining a position of the workpiece holder, the second frame of reference defining the position of the tool and the third frame of reference defining a position of the clamp frame. Based on a 3 dimensional computer model of the workpiece and robotic arm, a target position for a machining position of the tool is defined and, in step 1102, the robot arm is actuated to move to the target position. The second frame of reference is used to adjust the position of the tool based on a measured difference between the actual measured position of the tool and the nominal position of the tool as defined in the digital twin for the robot arm. The target position is also offset using a previously stored local offset for the machining position. Once the robot is moved, i.e. against a location on the workpiece for machining, in step 1103 the clamp is operated to provide a required clamping force against the workpiece. The third frame of reference on the clamp frame is measured in step 1104 to determine an offset resulting from the clamping operation. The stored local offset for the target position may then be updated in step 1105. A check is made at step 1106 as to whether the position of the third frame of reference is within a required tolerance. If the check passes, the machining operation is carried out in step 1106. If the check does not pass, the machining operation is aborted and the process returns to step 1102 after the clamp is withdrawn at step 1108. The updated offset is then used, which should result in the tolerance requirement being passed. A maximum number of repeat cycles may be set in step 1106 for each machining position. If the maximum number is reached, the machining operating for that location may be aborted or the machining operation carried out with a reduced tolerance. The overall cycle is repeated for each machining location, with the local offset being updated for each target position corresponding to a machining location on the workpiece.

During the machining operation, the third frame of reference may be monitored to check for any movement of the frame. If movement above a predetermined threshold is detected, this may indicate instability and a clamping force may be increased for a subsequent machining operation.

Carrying out the procedures as described above over repeated cycles results in the offsets, and optionally also the clamping forces, applied for each machining location being updated and optimised as the procedures are repeated. The process of FIG. 10 can be repeated for every machining location multiple times to obtain optimised offsets for each machining location prior to any machining being carried out. The process of FIG. 11 can also be repeated for every machining location multiple times on multiple workpieces to optimise the offsets and optionally also optimise the clamping force applied for each machining location.

Figure 12:
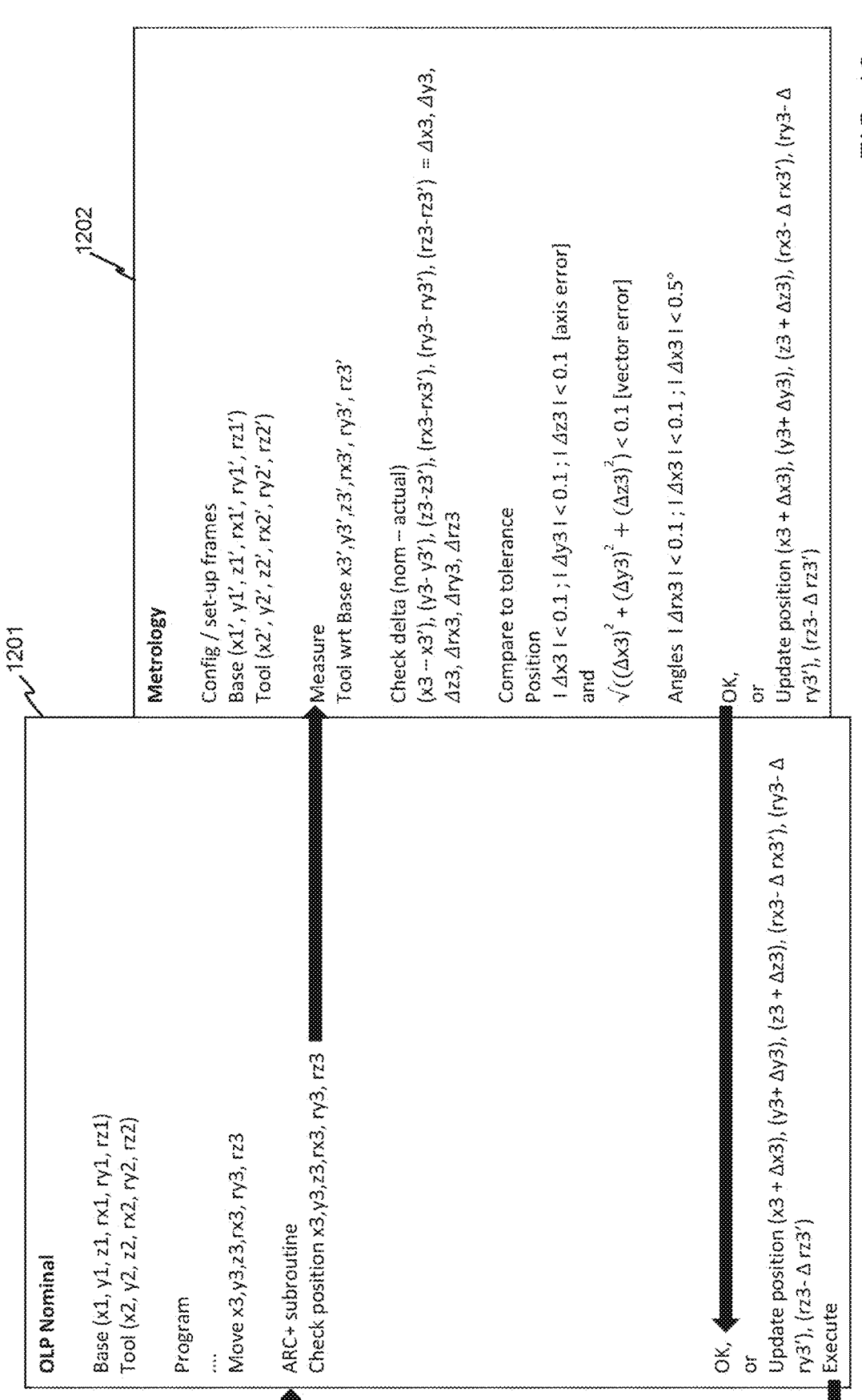
FIG. 12 is a diagram illustrating a series of operations carried out by a controller and metrology system during operation of a robotic tool.

FIG. 12 illustrates an example sequence of operations taken during processes described above, indicating steps 1201 taken by the robotic arm controller and steps 1202 taken by the metrology system. In the robotic arm controller, nominal reference frames of the base and tool are defined by cartesian coordinates $x_1$, $y_1$, $z_1$ for the base and $x_2$, $y_2$, $z_2$ for the tool, and rotations $rx_1$, $ry_1$, $rz_1$ for the base and $rx_1$, $rx_2$, $rz_2$ for the tool. When operating the robotic arm, an instruction is provided to move the tool to coordinates $x_3$, $y_3$, $z_3$, $rx_3$, $ry_3$, $rz_3$. In parallel, the metrology system configures corresponding frames of reference for the base and tool $x_1'$, $y_1'$, $z_1'$, $rx_1'$, $ry_1'$, $rz_1'$ and $x_2'$, $y_2'$, $z_2'$, $rx_2'$, $ry_2'$, $rz_2'$. After the robotic arm is moved, a check on the position is made by measuring the position of the tool with respect to the base, resulting in coordinates $x_3'$, $y_3'$, $z_3'$, $rx_3'$, $ry_3'$, $rz_3'$. The metrology system checks the difference between the measured coordinates and the nominal coordinates, resulting in $(x_3-x_3')$, $(y_3-y_3')$, $(z_3-rx_3')$, $(rx_3-rx_3')$, $(ry_3-ry_3')$, $(rz_3-rz_3')$ $=\Delta x_3$, $\Delta y_3$, $\Delta z_3$, $\Delta rx_3$, $\Delta ry_3$, $\Delta rz_3$. This difference is compared to a predetermined tolerance, which may for example be required to be less than 0.1 mm in each cartesian axis and in a combined vector, i.e. $|\Delta x_3|<0.1$; $|\Delta y_3|<0.1$; $|\Delta z_3|<0.1$ and $\sqrt{((\Delta x_3)^2+(\Delta y_3)^2+(\Delta z_3)^2)}<0.1$. An angular error may also be determined, which may for example be required to be less than 0.5 degrees from nominal in each axis, i.e. $|\Delta rx_3|<0.1$; $|\Delta x_3|<0.1$; $|\Delta x_3|<0.5°$. If the differences are all within the required tolerances, the process moves on to the next position, otherwise the position offsets are updated such that the position coordinates become $(x_3+\Delta x_3)$, $(y_3+\Delta y_3)$, $(z_3+\Delta z_3)$, $(rx_3-\Delta rx_3')$, $(ry_3-\Delta ry_3')$, $(rz_3-\Delta rz_3')$.

The system described herein may be extended to control of multiple robot arms, each with attached tools. The position of each tool may be determined with respect to a common first frame of reference, for example defining the position of a common workpiece holder.

In alternative arrangements, the workpiece to be machined may instead be held by the robot while the tool and clamp are either in a fixed position or held on another robot.

The working volume may be extended by adding further metrology systems that are linked together in a network of metrology systems.

The third frame of reference may be physical, i.e. an identified location on the clamp, or may be virtual, i.e. an identified point in space within a virtual model.

Other embodiments are intentionally within the scope of the invention as defined by the appended claims.

The invention claimed is:

1. A computer-implemented method of tracking a position of a tool relative to a workpiece mounted on a workpiece holder, the method comprising:
   i) identifying a first frame of reference defining the position of the workpiece;
   ii) identifying a second frame of reference defining a position of a machining head of the tool attached to a robotic arm, the tool being moveable relative to the workpiece using the robotic arm and further comprising a clamp moveable relative to the machining head;
   iii) identifying a third frame of reference defining a position of the clamp;
   iv) actuating the robotic arm to move the tool to a first target position relative to the workpiece;

v) operating the clamp to apply a clamping force on the workpiece;
   vi) measuring a position of the third frame of reference; and
   vii) updating an offset to the first target position based on movement of the third frame of reference after operating the clamp.

2. A computer-implemented method of tracking a position of a workpiece relative to a tool, the method comprising:
   i) identifying a first frame of reference defining the position of the workpiece, the workpiece being attached to an end of a robotic arm;
   ii) identifying a second frame of reference defining a position of a machining head of the tool, the tool further comprising a clamp moveable relative to the machining head;
   iii) identifying a third frame of reference defining a position of the clamp;
   iv) actuating the robotic arm to move the workpiece to a first target position relative to the tool;
   v) operating the clamp to apply a clamping force on the workpiece;
   vi) measuring a position of the first frame of reference; and
   vii) updating an offset to the first target position based on movement of the first frame of reference after operating the clamp.

3. The method of claim 1, wherein the first frame of reference is identified based on a plurality of datums on the workpiece holder and/or on the workpiece.

4. The method of claim 1, wherein the second frame of reference is identified based on a plurality of datums on the machining head.

5. The method of claim 1, wherein the third frame of reference is identified based on a plurality of datums on the clamp.

6. The method of claim 1, wherein the first, second and third frames of reference each define a three dimensional position and orientation of a point on the workpiece, machining head and clamp respectively.

7. The method of claim 1, wherein the method is repeated for a plurality of target positions on the workpiece.

8. The method of claim 7, wherein an offset is stored for each of the plurality of target positions.

9. The method of claim 1, wherein iv) to vii) are repeated in response to the measured position of the third or first frame of reference being outside of a predetermined tolerance.

10. The method of claim 1 further comprising operating the machining head to machine the workpiece.

11. The method of claim 10, wherein a clamping force applied by the clamp during machining the workpiece is updated based on a measure of movement of the third frame of reference relative to the first frame of reference during machining of the workpiece.

12. The method of claim 11, wherein the clamping force is increased if the measure of movement exceeds a predetermined range.

13. A non-transitory computer readable medium comprising a computer program stored thereon comprising instructions for causing a computer system to perform the method according to claim 1 when the instructions are executed by the computer system.

14. A robotic drilling system comprising:
   a robotic arm having a tool attached thereto, the tool comprising a machining head and a clamp moveable relative to the machining head;

a workpiece holder configured for mounting a workpiece to be machined;

a metrology system configured to measure a position of the workpiece and positions of the machining head and clamp relative to the workpiece;

a controller connected for control of the metrology system, robotic arm and tool, wherein the controller is configured to:

i) identify, using the metrology system, a first frame of reference defining a position of the workpiece;

ii) identify, using the metrology system, a second frame of reference defining a position of the machining head;

iii) identify, using the metrology system, a third frame of reference defining a position of the clamp;

iv) actuate the robotic arm to move the machining head to a first target position relative to the workpiece;

v) operate the clamp to apply a clamping force on the workpiece;

vi) measure, using the metrology system, a position of the third frame of reference; and vii) update an offset to the first target position based on movement of the third frame of reference after operating the clamp.

15. A robotic system comprising:

a robotic arm having a workpiece attached thereto;

a tool comprising a machining head and a clamp moveable relative to the machining head;

a metrology system configured to measure a position of the workpiece and positions of the machining head and clamp;

a controller connected for control of the metrology system, robotic arm and tool, wherein the controller is configured to:

i) identify, using the metrology system, a first frame of reference defining a position of the workpiece;

ii) identify, using the metrology system, a second frame of reference defining a position of the machining head;

iii) identify, using the metrology system, a third frame of reference defining a position of the clamp;

iv) actuate the robotic arm to move the workpiece to a first target position relative to the tool;

v) operate the clamp to apply a clamping force on the workpiece;

vi) measure, using the metrology system, a position of the first frame of reference; and vii) update an offset to the first target position based on movement of the first frame of reference after operating the clamp.

16. The system of claim 14, wherein the first frame of reference is defined by a plurality of datums on the workpiece holder and/or on the workpiece.

17. The system of claim 14, wherein the second frame of reference is defined by a plurality of datums on the machining head.

18. The system of claim 14, wherein the third frame of reference is defined by a plurality of datums on the clamp.

19. The system of claim 14, wherein the first, second and third frames of reference each define a three dimensional position and orientation of a point on the workpiece, machining head and clamp respectively.

20. The system of claim 14, wherein the controller is configured to repeat steps i) to vii) for a plurality of target positions on the workpiece.

21. The system of claim 14, wherein the controller is configured to store an offset for each of the plurality of target positions.

22. The system of claim 14, wherein the controller is configured to repeat iv) to vii) if the measured position of the third or first frame of reference is outside of a predetermined tolerance.

23. The system of claim 14, wherein the controller is configured to operate the machining head to machine the workpiece.

24. The system of claim 23, wherein the controller is configured to apply a clamping force by the clamp during machining the workpiece and update the offset based on a measure of movement of the third frame of reference relative to the first frame of reference during machining of the workpiece.

25. The system of claim 24, wherein the controller is configured to increase the clamping force if the measure of movement exceeds a predetermined range.

* * * * *